(12) United States Patent
Arai et al.

(10) Patent No.: US 9,036,210 B2
(45) Date of Patent: May 19, 2015

(54) IMAGE PROCESSING DEVICE, IMAGE FORMING APPARATUS, IMAGE PROCESSING METHOD, AND NON-TRANSITORY COMPUTER READABLE MEDIUM

(71) Applicant: FUJI XEROX CO., LTD., Tokyo (JP)

(72) Inventors: Shigeru Arai, Kanagawa (JP); Kenji Hara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/187,780

(22) Filed: Feb. 24, 2014

(65) Prior Publication Data

US 2015/0002903 A1    Jan. 1, 2015

(30) Foreign Application Priority Data

Jul. 1, 2013   (JP) ................. 2013-138421

(51) Int. Cl.
| | |
|---|---|
| G06K 15/00 | (2006.01) |
| H04N 1/40 | (2006.01) |
| H04N 1/403 | (2006.01) |
| G06K 15/02 | (2006.01) |
| G06K 15/14 | (2006.01) |

(52) U.S. Cl.
CPC ............ G06K 15/1872 (2013.01); G06K 15/14 (2013.01)

(58) Field of Classification Search
None
See application file for complete search history.

(56) References Cited

U.S. PATENT DOCUMENTS 6,233,062 B1 *   5/2001   Takamatsu et al. ........... 358/463

FOREIGN PATENT DOCUMENTS

| JP | A-2006-262204 | 9/2006 |
| JP | A-2012-28952 | 2/2012 |

* cited by examiner

*Primary Examiner* — Vincent Rudolph
*Assistant Examiner* — Michael Burleson
(74) *Attorney, Agent, or Firm* — Oliff PLC (57) ABSTRACT

An image processing device includes a detector that detects a target pixel as an outline pixel if a density of a predetermined region including the target pixel with each pixel of an image treated as the target pixel is equal to or above an outline determination threshold value, the outline determination threshold value being a threshold value set in response to the density of the target pixel, and being a threshold value used to determine whether the target pixel is an outline pixel corresponding to an outline of the image, and a correction unit that corrects a correction pixel, as a correction target having a density equal to or above a predetermined density from among the outline pixels detected by the detector, in response to a density of the correction pixel.

8 Claims, 8 Drawing Sheets

| 1 | 0 | -1 |
|---|---|----|
| 1 | 0 | -1 |
| 1 | 0 | -1 |

FIG. 6B

| 1 | 1 | 1 |
|---|---|---|
| 0 | 0 | 0 |
| -1 | -1 | -1 |

FIG. 6C

| 1 | 1 | 0 |
|---|---|---|
| 1 | 0 | -1 |
| 0 | -1 | -1 |

FIG. 6D

| 0 | 1 | 1 |
|---|---|---|
| -1 | 0 | 1 |
| -1 | -1 | 0 |

IMAGE PROCESSING DEVICE, IMAGE FORMING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-138421 filed Jul. 1, 2013.

BACKGROUND

Technical Field

The present invention relates to an image processing device, an image forming apparatus, an image processing method, and a non-transitory computer readable medium.

SUMMARY

According to an aspect of the invention, an image processing device is provided. The image processing device includes a detector that detects a target pixel as an outline pixel if a density of a predetermined region including the target pixel with each pixel of an image treated as the target pixel is equal to or above an outline determination threshold value, the outline determination threshold value being a threshold value set in response to the density of the target pixel, and being a threshold value used to determine whether the target pixel is an outline pixel corresponding to an outline of the image, and a correction unit that corrects a correction pixel, as a correction target having a density equal to or above a predetermined density from among the outline pixels detected by the detector, in response to a density of the correction pixel.

BRIEF DESCRIPTION OF THE DRAWINGS

Exemplary embodiment of the present invention will be described in detail based on the following figures, wherein.

DETAILED DESCRIPTION

Embodiment of the present invention is described below with reference to the drawings. Elements having the same operation and function are designated with the same reference symbol throughout the drawings and the discussion thereof, once made, is not repeated.

Let Y represent yellow, M magenta, C cyan, and k black. If a component is to be discriminated by color, the reference numeral of that component ends with one of the color suffixes (Y, M, C, and K).

If each component is collectively referred to without being discriminated by color, the color suffix is not attached.

Figure 1:
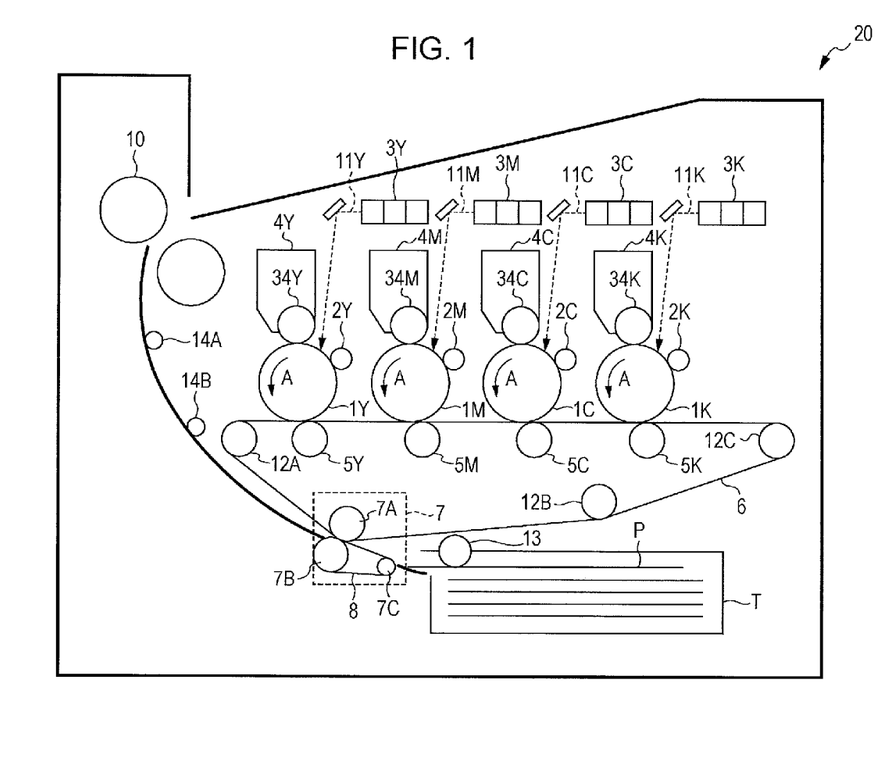
FIG. 1 diagrammatically illustrates a portion of an image forming apparatus.

FIG. 1 diagrammatically illustrates a portion of an electrophotographic image forming apparatus 20 of an embodiment. The image forming apparatus 20 has an image forming function. With the image forming function, the image forming apparatus 20 receives a variety of data via a communication line (not illustrated), and performs a color image forming process in response to the received data.

The image forming apparatus 20 includes four photoconductor drums 1Y, 1M, 1C and 1K that rotate in a direction denoted by arrows A, and charging devices 2Y, 2M, 2C and 2K that electrically charge the respective photoconductor drums 1Y, 1M, 1C, and 1K by applying charging biases.

The image forming apparatus 20 includes laser output units 3Y, 3M, 3C and 3K and development rollers 34Y, 34M, 34C and 34K. The laser output units 3Y, 3M, 3C, and 3K expose a surface of the charged photoconductor drum 1 to exposure light that has been modulated with image information of each color to form an electrostatic latent image on the photoconductor drum 1. The development rollers 34Y, 34M, 34C and 34K as developer holder hold developers (toner) of respective colors.

The image forming apparatus 20 further includes development devices 4Y, 4M, 4C and 4K and first transfer devices 5Y, 5M, 5C and 5K. The development devices 4Y, 4M, 4C and 4K develop respective toner images from the electrostatic latent images on the photoconductor drum 1 by applying development biases on the development rollers 34Y, 34M, 34C and 34K using development bias voltage supply units (not illustrated). The first transfer devices 5Y, 5M, 5C and 5K transfer toner images thereof on the photoconductor drum 1 to an intermediate transfer belt 6.

The image forming apparatus 20 further includes a paper sheet feeder T that stores a paper sheet P therein, a second transfer device 7 that transfers the toner image on the intermediate transfer belt 6 to the paper sheet P, a fixing device 10 that fixes the toner image transferred onto the paper sheet P, and a belt cleaner (not illustrated) that cleans residual toner remaining on the surface of the intermediate transfer belt 6 after the transfer of the toner image to the paper sheet P.

The image forming apparatus 20 further includes a cleaner (not illustrated) that cleans the surface of each photoconductor drum 1, and an electrostatic eliminator that removes a residual charge on the surface of the photoconductor drum 1.

An image forming operation of the image forming apparatus 20 of FIG. 1 is described below.

A terminal apparatus, such as a personal computer (not illustrated), outputs image data as an image forming target to the image forming apparatus 20 via a communication line (not illustrated). The image data includes pixels, each having a density represented in 256 (8 bit) level gradation. In the present embodiment, the density of each pixel is represented in 256 (8 bit) level gradation. The present invention is not limited to the 256 gradation levels, and the density of each pixel may be represented in different level gradation.

In response to the inputting of the image data, the image forming apparatus 20 applies a charging bias to the charging device 2 to negatively charge the surface of the photoconductor drum 1.

The image data is input to a controller 40 to be discussed below in the image forming apparatus 20. The controller 40 performs an image processing process on the input image data, separates image data of YMCK colors from the image processed image data, and outputs a modulation signal of the image data of each color to the laser output unit 3 of the corresponding color. The laser output unit 3 then outputs a laser light beam 11 that has been modulated with the input modulation signal.

The surface of the photoconductor drum 1 is irradiated with the modulated laser light beam 11. If the surface of the photoconductor drum 1, negatively charged by the charging device 2, is irradiated with the laser light beam 11, a charge on a portion irradiated with the laser light beam 11 disappears. Electrostatic latent images responsive to the image data of the YMCK colors are thus formed on the photoconductor drum 1.

The development devices 4Y, 4M, 4C and 4K include Y, M, C, and K colored and negatively charged toners, and the development rollers 34 that attaches the toners onto the photoconductor drums 1.

When the electrostatic latent image formed on the photoconductor drum 1 reaches the development device 4, a development bias voltage supply (not illustrated) applies a development bias to the development roller 34 in the development device 4. The color toners held on the surfaces of the development rollers 34Y, 34M, 34C and 34K are attracted to the electrostatic latent images of the photoconductor drums 1Y, 1M, 1C and 1K. The photoconductor drums 1Y, 1M, 1C and 1K have the toner images thereof responsive to the color image data.

Rollers 12A, 12B and 12C and a backup roller 7A of the second transfer device 7, rotated by motors (not illustrated), transport the intermediate transfer belt 6 through the nip formed between the first transfer device 5 and the photoconductor drum 1, and thus causes the intermediate transfer belt 6 to be pressed against the photoconductor drum 1. When the first transfer device 5 applies a first transfer bias to the intermediate transfer belt 6, the toner image of each color formed on the photoconductor drum 1 is transferred onto the intermediate transfer belt 6. The rollers 12A, 12B and 12C and the backup roller 7A are controlled in rotation so that a transfer start position of the toner image of each color to the intermediate transfer belt 6 is aligned. The toner images of the colors are superimposed, resulting in a toner image responsive to the image data on the intermediate transfer belt 6.

The photoconductor drum 1 having transferred the toner image to the intermediate transfer belt 6 is cleaned of remnants, such as residual toner on the surface of the photoconductor drum 1, by the cleaner (not illustrated), and the residual charge is also removed from the photoconductor drum 1 by the electrostatic eliminator (not illustrated).

The second transfer device 7 includes the backup roller 7A configured to support the intermediate transfer belt 6, a second transfer roller 7B configured to hold the paper sheet P with the backup roller 7A, a supporting roller 7C, and a second transfer belt 8 entrained about the second transfer roller 7B and the supporting roller 7C, and configured to transport the paper sheet P in synchronization with the rotation of the second transfer roller 7B. The second transfer roller 7B, kept in contact with the intermediate transfer belt 6, rotates in synchronization with the movement of the intermediate transfer belt 6.

A paper transport roller 13 that is rotated by a motor (not illustrated) transports the paper sheet P from within the paper sheet feeder T into the nip of the second transfer device 7, more specifically, the nip formed between the backup roller 7A and the second transfer roller 7B.

When the paper sheet P and the intermediate transfer belt 6 are pinched into the nip between the backup roller 7A and the second transfer roller 7B with the paper sheet P facing the surface of the intermediate transfer belt 6 having the toner image, the second transfer bias is applied to the backup roller 7A to transfer the toner image formed on the intermediate transfer belt 6 in response to the image data onto the paper sheet P. The paper sheet P is then transported to a fixing device 10 by intermediate transport rollers 14A and 14B. The fixing device 10 heats and fuses the toner image transferred to the paper sheet P, thereby fixing the toner image onto the paper sheet P.

The belt cleaner (not illustrated) removes the remnants, such as the residual toner remaining on the surface of the intermediate transfer belt 6, from which the toner image has been transferred to the paper sheet P.

Although the single paper sheet feeder T is illustrated in FIG. 1, multiple paper sheet feeders T may be used depending on type, paper thickness, and size of the paper sheets P. Besides the image forming function, the image forming apparatus 20 of the present embodiment may have a photocopying function to copy onto the paper sheet P an image read by an image reading device, such as a scanner.

The paper sheet P responsive to the image data is formed on the paper sheet P, and the image forming process is complete.

Figure 2:
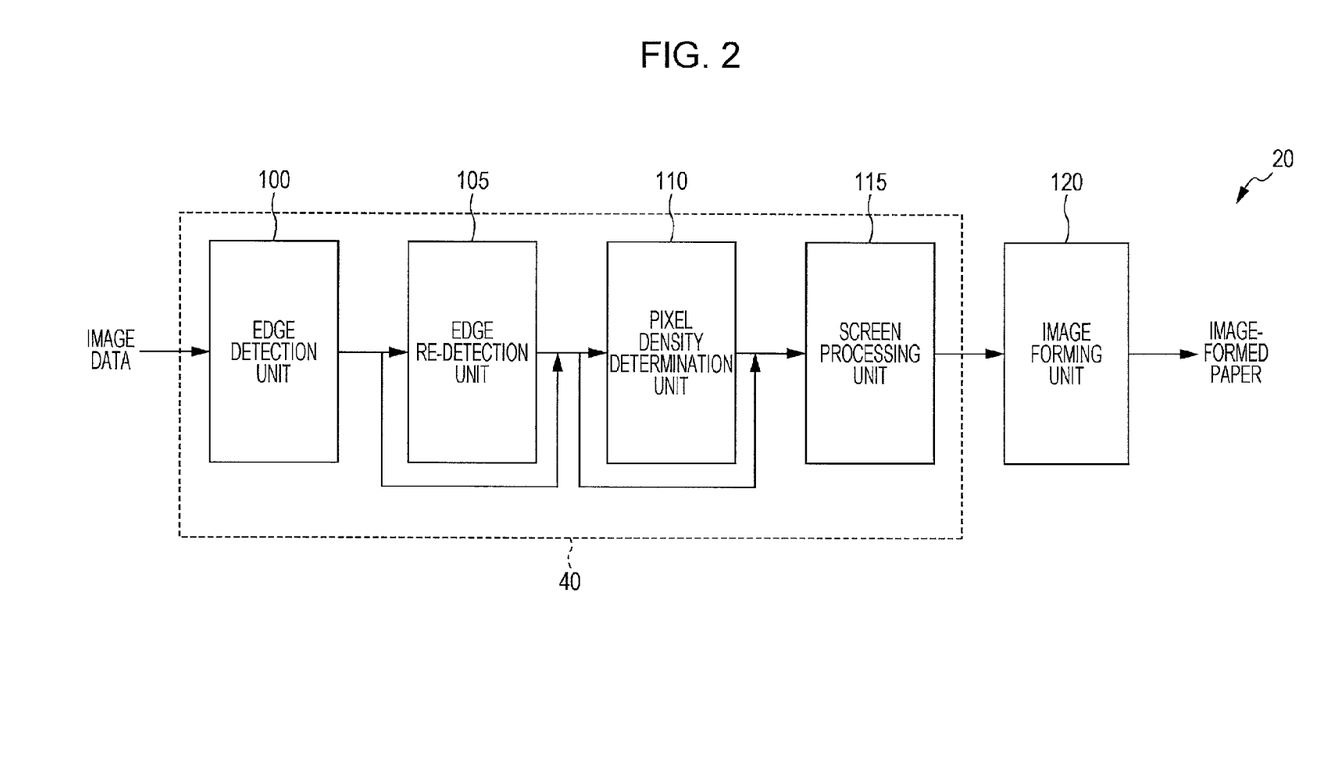
FIG. 2 is a functional block diagram illustrating the image forming apparatus.

FIG. 2 is a functional block diagram illustrating the image forming apparatus 20 of the present embodiment. The image forming apparatus 20 includes the controller 40 configured to perform the image processing process on the image data, and an image forming unit 120 configured to form a toner image on the paper sheet P.

The controller 40 includes an edge detection unit 100, an edge re-detection unit 105, a pixel density determination unit 110 and a screen processing unit 115. The edge detection unit 100 detects, from among pixels forming image data of an image, a pixel corresponding to an outline of the image (hereinafter referred to as an edge pixel). The edge re-detection unit 105 detects an edge pixel in a determination method different from the determination method of the edge detection unit 100 by determining whether a pixel (hereinafter referred to as a non-edge pixel) that the edge detection unit 100 have not detected as an edge pixel is an edge pixel or not. The pixel density determination unit 110 finally determines whether a pixel is an edge pixel or not in accordance with the density of the edge pixel. The screen processing unit 115 converts the density of each pixel into area gradation using processes different from the edge pixel to the non-edge pixel.

The edge detection unit 100 successively treats each of the pixels included in the image data as a target pixel, and determines whether the target pixel is an edge pixel or a non-edge pixel. A pixel detected as a non-edge pixel serves as a detection target pixel of the edge re-detection unit 105.

The edge re-detection unit 105 successively treats each of the non-edge pixels as a target pixel and determines whether an edge pixel count of a predetermined region including the target pixels is equal to or above a threshold value (a re-determination edge pixel count). If the edge pixel count in the predetermined region is equal to or above the re-determination edge pixel count, the non-edge pixel as a target pixel is detected as an edge pixel. In this case, the re-determination edge pixel count is modified depending on the density of the target pixel. For example, if the density of the target pixel is 1000, in other words, the pixel value of the target pixel is 255, the re-determination edge pixel count may be set to be a value higher than the re-determination edge pixel count with the density of the target pixel being lower than 100%.

The pixel detected as an edge pixel by the edge re-detection unit 105 is set to be a determination target pixel of the pixel density determination unit 110.

The pixel density determination unit 110 successively treats as a target pixel each pixel that is detected as an edge pixel by the edge detection unit 100 and the edge re-detection unit 105 and finally determines that the target is an edge pixel if the density of the target pixel is equal to or above a predetermined density (hereinafter referred to as a corrected pixel density). On the other hand, if the density of the target pixel is lower than the corrected pixel density, the pixel density determination unit 110 determines that the target pixel is a non-edge pixel.

The corrected pixel density is set to be a low-density value or an intermediate-density value. The low-density value may be a density of 40% (a pixel value of 102) or lower, the intermediate-density value may be a density higher than 40% but equal to or lower than 80% (a pixel value of 204), and a high-density value may be a density higher than 80%.

In the present trend in the image processing, an edge pixel is detected from an image in a range from the low density to the high density, and the screen processing unit 115 performs a correction process on the edge pixels including ones having a low density. This is intended to increase image quality in comparison with the case in which an edge pixel is detected from pixels having an intermediate to high density. For example, in the present embodiment, a corrected pixel density is set to be 40% in the low-density region.

The screen processing unit 115 performs a screening process to represent the density of each pixel. More specifically, the screen processing unit 115 performs the screening process to convert the density of each pixel into a value in the area gradation.

A screen line count as a parameter used in the screening process represents the number of screen lines per inch. The screen line count appropriate for the image may be different from type to type of the image.

If an image is a photograph, a screen line count of 200 or so is desirable in view of human vision characteristics. A higher screen line count degreases gradation and granularity because of response of a marking engine. Conversely, a lower screen line count emphasizes a screen structure, nullifying the texture of the image. The typically used screen line count falls within a range of 170 lines or above to 230 lines or below. If an image is computer graphics, gradation and granularity are of a high value. The typically used screen line count thus falls within a range of 150 lines or above to 200 lines or below.

If the image type is a character or a line, an edge portion thereof is desirably free from a jaggy pattern having a rugged outline or an intermittently broken outline, and a screen line count of 300 lines is typically used. Even in a character or a line, a non-edge portion uses no such a high screen line count as the one used in the edge portion.

If the image type is a character or a line, the screen processing unit 115 performs the screening process using a screen line count of 600 lines for the edge pixel and a screen line count of 200 lines for the non-edge pixel. In the present embodiment, the screen line count for use in the screening process may be determined by the user of the image forming apparatus 20. The screen processing unit 115 performs the screening process of the non-edge pixel using the screen line count set by the user as a user selected screen line count. On the other hand, the screen line count for use in the screening process of the edge pixel is a screen line count predetermined in accordance with the specifications of the image forming apparatus 20.

As will be described below, the screen processing unit 115 determines whether each edge pixel as a target pixel has a density equal to or above a predetermined threshold value (hereinafter referred to as an outline extraction threshold value). The outline extraction threshold value is a density threshold value that causes the character or the line to be blurred. If the density of the target pixel is equal to or above the outline extraction threshold value, correction is performed to control the blurring of the character or the line (hereinafter referred to as sharpness correction). If the density of the target pixel is lower than the outline extraction threshold value, correction is performed to control a jaggy pattern or an intermittently broken outline pattern (hereinafter referred to as smoothing correction).

The image forming unit 120 performs an image forming operation discussed with reference to FIG. 1, thereby forming on the paper sheet P a toner image responsive to the image data that has undergone the screening process.

Figure 3:
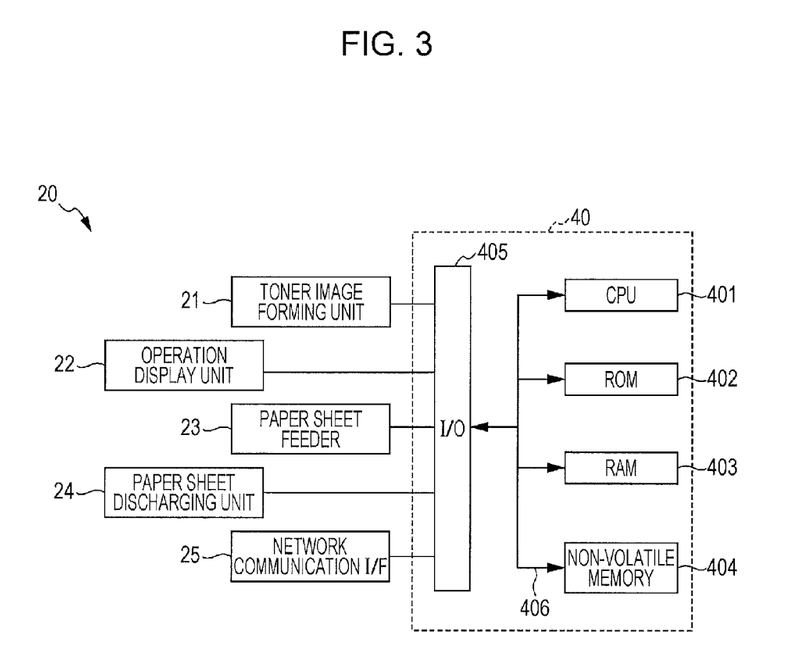
FIG. 3 is a block diagram illustrating an electrical system of the image forming apparatus.

FIG. 3 is a block diagram illustrating a portion of an electrical system of the image forming apparatus 20 of the present embodiment.

The controller 40 in the image forming apparatus 20 may be a computer 40, for example. The computer 40 includes a central processing unit (CPU) 401, a read-only memory (ROM) 402, a random-access memory (RAM) 403, a non-volatile memory 404, an input/output (I/O) interface 405, and a bus 406 that interconnects these elements. The I/O interface 405 connects to a toner image forming unit 21, an operation display unit 22, a paper sheet feeder 23, a paper sheet discharging unit 24 and a network communication interface 25.

The toner image forming unit 21 includes devices for the image forming apparatus 20 to form the toner image on the paper sheet P. For example, such devices include the photoconductor drum 1, the charging device 2, the laser output unit 3, the development device 4, the intermediate transfer belt 6, the second transfer device 7, and the fixing device 10.

The operation display unit 22 includes a display button to receive an operation instruction, and a touchpanel display (not illustrated) to display a variety of information, each of these element implemented by a software program, and hardware keys (not illustrated) including numerical keys and a start button.

The paper sheet feeder 23 includes the paper sheet feeder T storing the paper sheet P and a paper feed mechanism to feed the paper sheet P to the toner image forming unit 21.

The paper sheet discharging unit 24 includes a discharging unit to discharge the paper sheet P and a discharging mechanism to discharge into the discharging unit the paper sheet P having the image formed thereon by the toner image forming unit 21. The discharging mechanism includes the intermediate transport rollers 14A and 14B.

The network communication interface 25, connected to a communication line (not illustrated), performs communications with a personal computer (not illustrated) connected to the communication line and an image reading device, such as a scanner (not illustrated). The network communication interface 25 includes a network interface card (NIC), for example.

Figure 4:
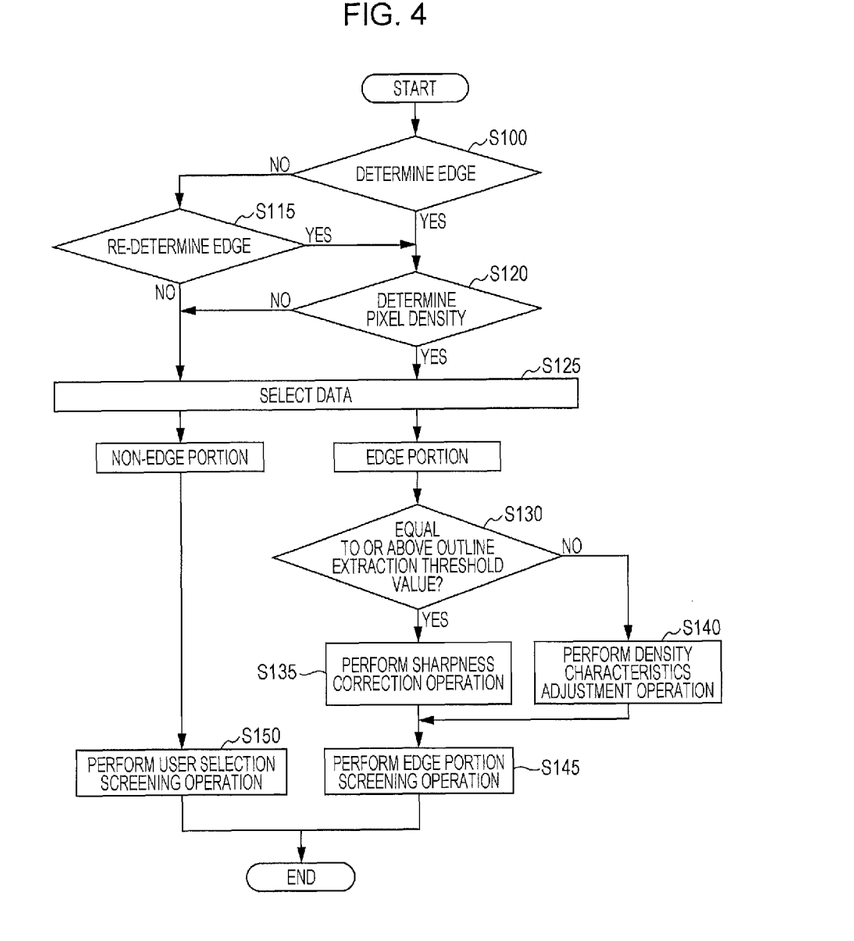
FIG. 4 is a flowchart illustrating an image processing process of an embodiment.
Figure 5:
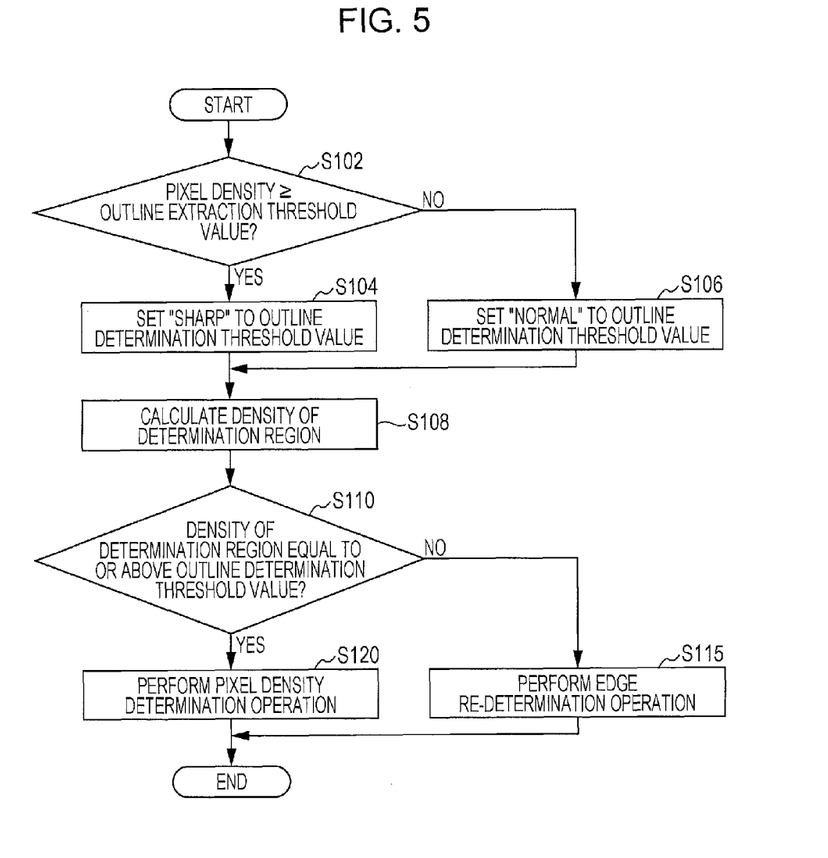
FIG. 5 is a flowchart illustrating an edge determination operation in the image processing process.

FIG. 4 and FIG. 5 are flowcharts illustrating a process of an image processing program to be executed by the CPU 401 in the image forming apparatus 20 of the present embodiment. The program is pre-stored on a predetermined area of the ROM 402. The CPU 401 executes the program upon receiving the image data.

The image processing program is not limited to the way in which the image processing program is distributed in a pre-installed form on the ROM 402. The image processing program may be distributed in a stored form on a non-transitory computer readable recording medium, such as a CD-ROM or a memory card. Alternatively, the image processing program may be distributed via a wired or wireless communication.

Note that the user of the image forming apparatus 20 has set the screen line count to be 200 lines in the present embodiment.

In step S100, an edge determination operation is performed to determine whether a target pixel is an edge pixel or not with each pixel in image data successively treated as the target pixel. FIG. 5 is a flowchart illustrating the edge determination operation. The edge determination operation in step S100 is described in detail with reference to FIG. 5.

In step S102, the CPU 401 determines whether the density of the target pixel is equal to or above the outline extraction threshold value. As described above, the outline extraction threshold value is a predetermined density threshold value at which a character or a line is likely to be blurred. The outline extraction threshold value may be determined based on tests conducted on the actual image forming apparatus 20 or based on computer simulation performed on design specifications of the image forming apparatus 20.

Studies performed by the inventors of the invention reveal that an image density equal to or below 90% causes image quality degradation including a jaggy pattern and an intermittently broken outline. If the image density is above 90%, the image quality degradation tends to be caused by the blurring of the character and the line.

If an image density of 96% or higher in particular causes the image quality degradation caused by the blurring of the character and the line to be pronounced.

The outline extraction threshold value is desirably so set that the density is approximately 100%. In the present embodiment, the outline extraction threshold value is set to be 254 corresponding to a pixel density equal to or above 99%. In other words, the outline extraction threshold value is a threshold value that determines whether to perform a correction to decrease the pixel density to control image quality degradation caused by the blurring of the character and the line.

The density of approximately 100% refers to a range of density in which image quality degradation caused by the character or line blurring is recognizable when the image is formed on the paper sheet P, in the same way as when the image is formed on the paper sheet P with a density of 100%.

The outline extraction threshold value is pre-stored on a predetermined area of the non-volatile memory 404. If the density of the target pixel is equal to or above the outline extraction threshold value, the CPU 401 proceeds to step S104.

In step S104, the CPU 401 reads "SHARP" pre-stored on a predetermined area on the non-volatile memory 404. The "SHARP" is a threshold value that is used to determine whether the target pixel is an edge pixel or not. The "SHARP" is set as the outline extraction threshold value pre-stored on the predetermined area of the RAM 403.

The value of "SHARP" is set to be a value equal to or above the outline extraction threshold value. The value of "SHARP" is desirably the outline extraction threshold value with "1" added thereto. In the present embodiment, the value of "SHARP" is set to be 255 corresponding to a density of 100%.

If the density of the target pixel is determined to be lower than the outline extraction threshold value in step S102, the CPU 401 proceeds to step S106.

In step S106, the CPU 401 reads a value of "NORMAL" pre-stored on a predetermined area of the non-volatile memory 404. As the value of "SHARP", the value of "NORMAL" is a threshold value that is used to determine whether the target pixel is an edge pixel or not. The CPU 401 sets the value of "NORMAL" to be the outline extraction threshold value stored on the predetermined area of the RAM 403.

The value of "NORMAL" is set to be lower than the outline extraction threshold value. The value of "NORMAL" is desirably set to be twice the corrected pixel density after the corrected pixel density is set to be lower than half the outline extraction threshold value. In the present embodiment, the value of "NORMAL" is set to be twice the corrected pixel density, namely, is set to be 204 corresponding to a density of 80%.

In step S108, the density of a determination region, in other words, the determination region density is determined using an edge detection filter having a determination area of 3×3 of FIG. 6.

Figure 6A:
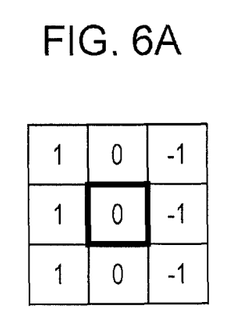
FIG. 6A through FIG. 6D illustrate an example of an edge detection filter.
Figure 6B:
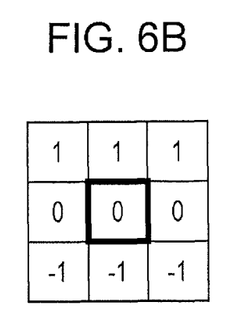
Figure 6C:
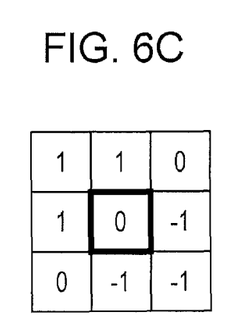
Figure 6D:
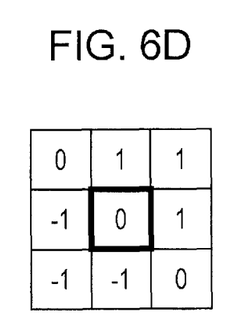

FIG. 6A illustrates a vertical edge detection filter that detects an edge extending vertically. FIG. 6B illustrates a horizontal edge filter that detects an edge extending horizontally. FIG. 6C illustrates a right upward slant edge detection filter that detects an edge extending at a slant angle from bottom left to top right. FIG. 6D illustrates a right downward slant edge detection filter that detects an edge extending at a slant angle from top left to bottom right.

The determination region density is determined as described below using these edge detection filters.

In each of the vertical edge filter, the horizontal edge filter, the right upward slant edge detection filter, and the right downward slant edge detection filter, a center portion of each edge detection filter surrounded by a bold outline (hereinafter referred to as a determination region center portion) is aligned with a target pixel. As for pixels of a peripheral portion surrounding the determination region center portion (hereinafter referred to as a determination region peripheral portion), the product sum of the values of each filter and the pixel values of the pixels is determined.

The maximum product sum from among the product sums of the filters and the pixel values is set to be the determination region density, and is stored on a predetermined area of the RAM 403.

FIG. 6 illustrates an example of the edge detection filter, and the size of the determination region is not limited to 3×3. The vertical size and the horizontal size of the determination region may be different, such as in 3×5.

A 1×1 edge detection filter having only the target pixel as the determination region may be used. Since there is no determination region peripheral portion in such a case, the product sum of the filter value and the pixel value at the determination region center portion serves as a determination region density.

The values of the edge detection filters of FIG. 6 include "−1", "0", and "1". An edge detection filter different in value and arrangement from those filters may be used depending on characteristics of the image data. Besides the method of setting the maximum product sum from among the product sums of the filters and the pixel values to be the determination region density, the average value or the median value of the product sums may be used for the determination region density.

In step S110, the CPU 401 reads the outline extraction threshold value and the determination region density, stored on the predetermined area of the RAM 403, and determines whether the determination region density is equal to or above the outline extraction threshold value.

If the answer to the determination step in S110 is affirmative, the CPU 401 sets in a bitmap table on the RAM 403 tag information "1" indicating that the target pixel is an edge pixel. The bitmap table has a one-to-one correspondence to the pixels of the image data. The CPU 401 proceeds to step S120. If the answer to the determination step in S110 is non-affirmative, the CPU 401 sets in the bitmap table on the RAM 403 tag information "0" indicating that the target pixel is a non-edge pixel, and proceeds to step S115.

The edge determination operation in step S100 has been described.

In step S115, the CPU 401 performs an edge re-determination operation. In the edge re-determination operation, the CPU 401 successively determines whether a pixel eligible to be treated as an edge pixel is included in target pixels with the target pixels once determined to be the non-edge pixels in the edge determination operation in step S100.

In the bitmap table stored on the predetermined area of the RAM 403, pixels having tag information "0" are successively treated as a target pixel, and the target pixel is then aligned with the determination region center portion of the edge re-detection area having a 3×3 determination region equal to the edge detection filter. The edge pixel count in the determination region peripheral portion of the edge re-detection area, in other words, the pixel count of the pixels having the tag information "1" is determined. If the edge pixel count in the determination region peripheral portion of the edge re-detection area is equal to or above the re-determination edge pixel count, the tag information of the target pixel is changed from "0" to "1". The target pixel is thus treated as an edge pixel instead of a non-edge pixel.

If the edge pixel count in the determination region peripheral portion of the edge re-detection area is lower than the re-determination edge pixel count, the tag information of the target pixel is not updated. The target pixel is determined to be a non-edge pixel.

If edge pixels more than a predetermined number are present in the vicinity of the non-edge pixel, a pixel determined to be a non-edge pixel in step S100 is processed as an edge pixel. The vicinity of the non-edge pixel herein refers to an area of the determination region peripheral portion of the edge re-detection area.

The re-determination edge pixel count is a value that is varied in response to the density of a target pixel. In the present embodiment, for example, if the density of the target pixel is equal to or above the outline extraction threshold value, the re-determination edge pixel count is set to be a number beyond which the edge portion of an image is difficult to expend, namely, "8" which is a number as large as possible within a set range. If the density of the target pixel is lower than the outline extraction threshold value, the re-determination edge pixel count is set to be a number, from which the edge portion of the image extends in image processing, namely, "2" which is smaller than the re-determination edge pixel count with the density of the target pixel being equal to or above the outline extraction threshold value.

In accordance with the present embodiment, the determination region of the edge re-detection area is set to be equal in size to the determination region of the edge detection filter. The two determination regions may be set be different.

Upon determining in the edge re-determination operation that the target pixel is an edge pixel, the CPU 401 proceeds to step S120. If not, the CPU 401 proceeds to step S125.

In step S120, the CPU 401 treats as a target pixel each of the pixels determined to be an edge pixel in the edge determination operation in step S100 or in the edge re-determination operation in step S115, and performs on the target pixel a pixel density determination operation to determine whether the density of the target pixel is equal to or above the corrected pixel density.

If the answer to the determination operation in step S120 is affirmative, the CPU 401 does not update the tag information of the target pixel and determines that the target pixel is an edge pixel, and proceeds to step S125. If the answer to the determination operation in step S120 is non-affirmative, the CPU 401 updates the tag information of the target pixel from "1" to "0", determines that the target pixel is a non-edge pixel, and then proceeds to step S125.

To increase image quality, the corrected pixel density is desirably set to be within a range from a low density lower than 50% to an intermediate density. In the present embodiment, for example, the corrected pixel density is set to be 40%, namely, 102 in pixel value.

In step S125, the CPU 401 references the tag information of the bitmap table, and selects a pixel having "0" as the tag information, namely, a non-edge pixel, or a pixel having "1" as the tag information, namely, an edge pixel. If an edge pixel is selected, the CPU 401 proceeds to step S130. If a non-edge pixel is selected, the CPU 401 proceeds to step S150.

In step S130, the CPU 401 treats as a target pixel a pixel selected as an edge pixel in step S125, and then determines whether the density of the target pixel is equal to or above the outline extraction threshold value.

As described above, the outline extraction threshold value is likely to cause a character or a line to be blurred, and thus serves as a threshold value as to whether to perform a correction to decrease the density of the pixel. In the present embodiment, the outline extraction threshold value is set to be 254 corresponding to a density of 99% or above.

If the density of the target pixel is equal to or above the outline extraction threshold value, the CPU 401 proceeds to step S135. If not, the CPU 401 proceeds to step S140.

In step S135, the CPU 401 performs a sharpness correction operation to decrease the density of the edge pixel. The sharpness correction operation controls the image quality degradation caused by the character and line blurring formed by an edge pixel having a density equal to or above the outline extraction threshold value. In the present embodiment, for example, the CPU 401 performs the sharpness correction operation so that the density of the edge pixel is 80% corresponding to a pixel value of 204. The density of the edge pixel subsequent to the sharpness correction operation is not limited to 80% and may be a density to the extent that the character and line blurring is controlled.

In step S140, the CPU 401 performs a smoothing correction operation. The image quality degradation caused by the jaggy pattern or the intermittently broken outline pattern formed by an edge pixel having a density lower than the outline extraction threshold value is to be controlled. To this end, the smoothing correction operation uses as an edge portion screen line count a screen line count of 600 lines higher than a screen line count of 200 lines as the user selected screen line count for the edge pixel.

An image density on the paper sheet P is higher when the screening operation (edge portion screening operation) is performed using an edge screen line count of 600 lines responsive to the density of the edge pixel than when the screening operation (edge portion screening operation) is performed using the user selected screen line count.

Referring to a density characteristics conversion table EELUT as a combination of the density characteristics of a user selection screening operation and an edge portion screening operation, the density of the edge pixel is adjusted to be lower than an actual density so that the image density with the edge portion screening operation performed is equal to the image density with the user selection screening operation performed.

More specifically, if the image density with the edge portion screening operation performed on the edge pixel having a pixel value of 152 is equal to the image density with the user selection screening operation performed on the edge pixel having a pixel value of 128, a correction is performed to decrease the pixel value of the edge pixel from 152 to 128. In this way, a density stepwise difference between the edge pixel and the non-edge pixel is decreased.

The density characteristics conversion table EELUT is determined based on tests conducted on the actual image forming apparatus 20 or based on computer simulation performed on design specifications of the image forming apparatus 20. The density characteristics conversion table EELUT is pre-stored on a predetermined area of the non-volatile memory 404.

In step S145, the CPU 401 controls the toner image forming unit 21, the paper sheet feeder 23 and the paper sheet discharging unit 24 to perform the edge portion screening operation to form an image responsive to the image data on the paper sheet P. The edge portion screening operation is performed on the edge pixel having undergone the sharpness correction operation in step S135 or the smoothing correction operation in step S140 using a screen line count of 600 lines higher than the user selected screen line count of 200 lines.

In step S150, the CPU 401 controls the toner image forming unit 21, the paper sheet feeder 23 and the paper sheet discharging unit 24 to perform the user selection screening operation on the pixel selected as a non-edge pixel in step S125 to form an image responsive to the image data on the paper sheet P.

The image processing process of the embodiment is thus complete.

FIG. 7 and FIG. 8 illustrate specific examples resulting from processing the image data in accordance with the image processing program of FIG. 4 and FIG. 5.

FIG. 7 illustrates a process of edge determination of the CPU 401 performed on a line as a type of image. The non-edge pixel is labeled "0", and the edge pixel is labeled "1".

Figure 7A:
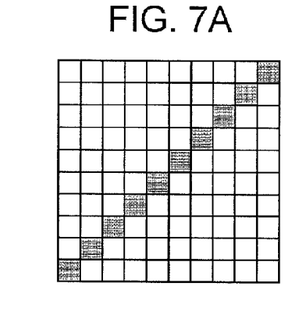
FIG. 7A through FIG. 7H illustrate an edge determination in the image processing process of the embodiment.

FIG. 7A illustrates the image data of the line that the CPU 401 receives before executing the image processing program. The line has a line width of one pixel and a pixel value of 110, namely, a density of about 43%.

Figure 7B:
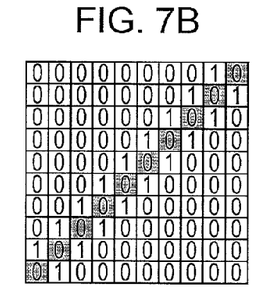

FIG. 7B illustrates a bitmap table that results from performing the edge determination operation in step S100 on the image data of FIG. 7A.

Figure 7C:
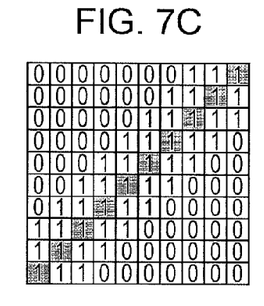

FIG. 7C illustrates a bitmap table that results from performing the edge re-determination operation in step S115 on the result of the edge determination operation of FIG. 7B.

Figure 7D:
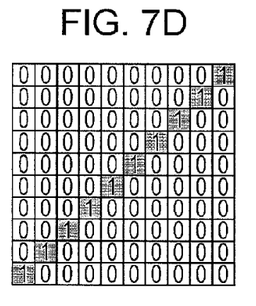

FIG. 7D illustrates a bitmap table that results from performing the pixel density determination operation in step S120 on the result of the edge re-determination operation of FIG. 7C.

FIG. 7D reveals that the edge of the line having an intermediate density closer to a low density region is correctly determined.

If the density of a line is equal to or above the corrected pixel density, the edge of the line is correctly determined in the same manner as in the results of FIG. 7D.

Figure 7E:
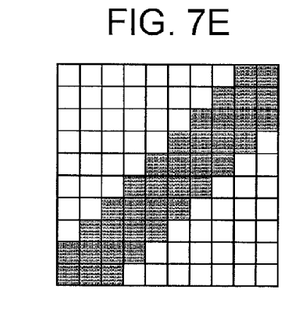

FIG. 7E illustrates image data of a line different from the line of FIG. 7A. The line has a line width of four pixels and a pixel value of 255, namely, a density of 100%.

Figure 7F:
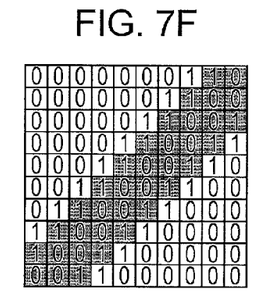

FIG. 7F illustrates a bitmap table that results from performing the edge determination operation in step S100 on the image data of FIG. 7E.

Figure 7G:
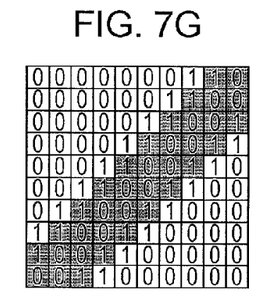

FIG. 7G illustrates a bitmap table that results from performing the edge re-determination operation in step S115 on the result of the edge determination operation of FIG. 7F.

Figure 7H:
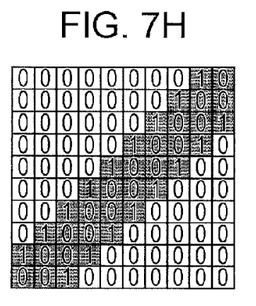

FIG. 7H illustrates a bitmap table that results from performing the pixel density determination operation in step S120 on the result of the edge re-determination operation of FIG. 7G.

FIG. 7H reveals that the edge of the line having a high density and involving the sharpness correction is also correctly determined. In the subsequent sharpness correction operation to be performed, the density of the edge of the line rather than the density of the whole line is decreased. The line blurring is thus controlled.

FIG. 8 compares a character in a state prior to the sharpness correction operation of the image processing program of the embodiment with a character that has undergone the sharpness correction operation.

Figure 8A:
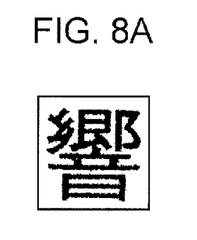
FIG. 8A through FIG. 8D illustrate the effect of sharpness correction in the image processing process of the embodiment.
Figure 8B:
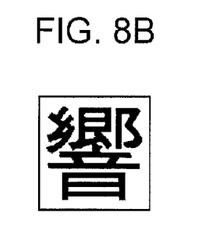

FIG. 8A illustrates a normal-font character with a density of 100% prior to the sharpness correction operation, and FIG. 8B illustrates the same normal-font character but subsequent to the sharpness correction operation.

Figure 8C:
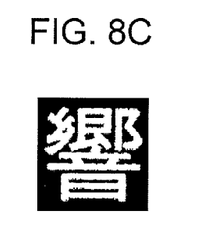
Figure 8D:
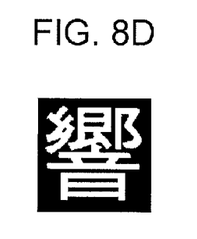

FIG. 8C illustrates a reverse-font character with a black background with a density of 100% prior to the sharpness correction operation, and FIG. 8D illustrates the same reverse-font character but subsequent to the sharpness correction operation.

The character blurring is reduced more in the normal-font character subsequent to the sharpness correction operation in FIG. 8B and the reverse-font character subsequent to the sharpness correction operation FIG. 8D than in the respective characters prior to the sharpness correction operation. The outline of the character is thus clearer.

The image processing process of the present embodiment helps allow a character or a line, having a density equal to or above the corrected image density, to be correctly read. Even if a character or a line has a density equal to or above the outline extraction threshold value, the image quality degradation caused by the blurring of the character or the line is controlled. Even if a character or a line has a density lower than the outline extraction threshold value, the image quality degradation caused by the jaggy pattern or the intermittently broken outline of a character and a line is also controlled.

In the image processing process of the present embodiment, the corrected pixel density may be set to be in a low density region, and the determination of character or line may be performed from the low density region. Even in such a case, the image quality degradation caused by the character and line blurring is controlled by modifying the outline extraction threshold value depending on whether the pixel density is equal to or above the outline extraction threshold value. The image quality degradation caused by the jaggy pattern or the intermittently broken outline of character and line is also controlled.

The embodiment of the present invention has been discussed. The scope of the present invention is not limited to the scope of the embodiment. Various changes or modifications are possible on the embodiment without departing from the scope and spirit of the present invention. The embodiment with such changes or modifications incorporated therewithin also falls within the scope of the present invention.

In the embodiment, the series of operations are implemented using a software structure. The present invention is not limited to software. The operations may be implemented using a hardware structure.

As a hardware structure example, the controller 40 may be implemented using a functional device. A high speed process may be expected in such an implementation in comparison with the software structure design.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
a detector that detects a target pixel as an outline pixel, in response to a density of a predetermined region, that includes the target pixel with each pixel of an image treated as the target pixel, is greater than or equal to an outline extraction threshold value, wherein an outline determination threshold value is set to a preset value based on whether the density of the target pixel is greater than or equal to the outline extraction threshold value, and wherein the outline determination threshold value is used to determine whether the target pixel is an outline pixel corresponding to an outline of the image; and
a correction unit that corrects a correction pixel having a density greater than or equal to a predetermined density selected from a density of the outline pixels detected by the detector, in response to a density of the correction pixel.

2. The image processing device according to claim 1, wherein the detector sets the outline determination threshold value to be a first threshold value equal to or above the predetermined threshold value if the density of the target pixel is equal to or above the predetermined threshold value that serves as a criterion according to which the correction unit determines whether to perform a correction to decrease the density of the correction pixel, detects the target pixel as the outline pixel if the density of the predetermined region is equal to or above the first threshold value, sets the outline determination threshold value to be a second threshold value that is lower than the predetermined threshold value if the density of the target pixel is lower than the predetermined threshold value, and detects the target pixel as the outline pixel if the density of the predetermined region is equal to or above the second threshold value.

3. The image processing device according to claim 2, wherein the second threshold value is twice as high as the predetermined threshold value.

4. The image processing device according to claim 2, wherein the correction unit performs the correction to decrease the density of the correction pixel if the density of the correction pixel is equal to or above the predetermined threshold value, and sets a number of screen lines forming the image corresponding to the correction pixel to be larger than a predetermined number of screen lines if the density of the correction pixel is lower than the predetermined threshold value.

5. The image processing device according to claim 3, wherein the correction unit performs the correction to decrease the density of the correction pixel if the density of the correction pixel is equal to or above the predetermined threshold value, and sets a number of screen lines forming the image corresponding to the correction pixel to be larger than a predetermined number of screen lines if the density of the correction pixel is lower than the predetermined threshold value.

6. An image forming apparatus comprising:
an image processing device including:
a detector that detects a target pixel as an outline pixel, in response to a density of a predetermined region, that includes the target pixel with each pixel of an image treated as the target pixel, is greater than or equal to an outline extraction threshold value, wherein an outline determination threshold value is set to a preset value based on whether the density of the target pixel is greater than or equal to the outline extraction threshold value, and wherein the outline determination threshold value is used to determine whether the target pixel is an outline pixel corresponding to an outline of the image, and
a correction unit that corrects a correction pixel having a density greater than or equal to a predetermined density selected from a density of the outline pixels detected by the detector, in response to a density of the correction pixel; and
an image forming unit that forms the image processed by the image processing device on a recording medium.

7. An image processing method comprising:
detecting a target pixel as an outline pixel, in response to a density of a predetermined region, that includes the target pixel with each pixel of an image treated as the target pixel, is greater than or equal to an outline extraction threshold value, wherein an outline determination threshold value is set to a preset value based on whether the density of the target pixel is greater than or equal to the outline extraction threshold value, and wherein the outline determination threshold value is used to determine whether the target pixel is an outline pixel corresponding to an outline of the image; and
correcting a correction unit that corrects a correction pixel having a density greater than or equal to a predetermined density selected from a density of the outline pixels detected by the detector, in response to a density of the correction pixel.

8. A non-transitory computer readable medium storing a program causing a computer to execute a process for processing an image, the process comprising:
detecting a target pixel as an outline pixel, in response to a density of a predetermined region, that includes the target pixel with each pixel of an image treated as the target pixel, is greater than or equal to an outline extraction threshold value, wherein an outline determination threshold value is set to a preset value based on whether the density of the target pixel is greater than or equal to the outline extraction threshold value, and wherein the outline determination threshold value is used to determine whether the target pixel is an outline pixel corresponding to an outline of the image; and
correcting a correction unit that corrects a correction pixel having a density greater than or equal to a predetermined density selected from a density of the outline pixels detected by the detector, in response to a density of the correction pixel.

* * * * *